(12) United States Patent
Yeh et al.

(10) Patent No.: US 12,301,104 B2
(45) Date of Patent: May 13, 2025

(54) ORing FET CONTROL CIRCUIT AND METHOD

(71) Applicant: Delta Electronics, Inc., Taoyuan (TW)

(72) Inventors: Yung-Sheng Yeh, Taoyuan (TW); Chih-Wei Liang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 90 days.

(21) Appl. No.: 18/371,371

(22) Filed: Sep. 21, 2023

(65) Prior Publication Data

US 2024/0113703 A1    Apr. 4, 2024

Related U.S. Application Data

(60) Provisional application No. 63/411,440, filed on Sep. 29, 2022.

(30) Foreign Application Priority Data

Aug. 7, 2023 (CN) .......................... 202310985393.5

(51) Int. Cl.
  *H02M 1/08* (2006.01)
  *H02M 1/00* (2006.01)
  (Continued)

(52) U.S. Cl.
  CPC ....... *H02M 1/4233* (2013.01); *H02M 1/0085* (2021.05); *H02M 1/081* (2013.01);
  (Continued)

(58) Field of Classification Search
  CPC ...... H02M 1/0085; H02M 1/08; H02M 1/081; H02M 1/4233; H03K 17/04106; H03K 17/063; H03K 17/302
  (Continued)

(56) References Cited

U.S. PATENT DOCUMENTS 6,301,133 B1 * 10/2001 Cuadra .................. H02J 1/102
                                                            363/65
6,462,926 B1 * 10/2002 Zaretsky .................. H02J 1/10
                                                            361/103
(Continued)

FOREIGN PATENT DOCUMENTS

CN    110022140 A    7/2019
CN    114189138 A    3/2022
(Continued)

*Primary Examiner* — William Hernandez
(74) *Attorney, Agent, or Firm* — KIRTON McCONKIE; Evan R. Witt

(57) ABSTRACT

An ORing FET control circuit and method are provided. The circuit includes an ORing FET, a comparator, first, second and third resistors, a first capacitor, a diode and a driving unit. The positive and negative input terminals of the comparator are electrically connected to the input and output voltages. The first resistor, the second resistor, the first (Continued)

capacitor, and the third resistor are electrically connected in series between a reference voltage and a ground terminal sequentially. The reference voltage is lower than a voltage at the positive input terminal. When the input voltage is lower than the output voltage, if a voltage across the ORing FET is larger than a threshold, the comparator outputs a driving signal at low level, and correspondingly the driving unit turns off the ORing FET. The threshold depends on resistances of the first and second resistors.

10 Claims, 4 Drawing Sheets

(51) Int. Cl.
 *H02M 1/42* (2007.01)
 *H03K 17/041* (2006.01)
 *H03K 17/06* (2006.01)
 *H03K 17/30* (2006.01)
(52) U.S. Cl.
 CPC ..... *H03K 17/04106* (2013.01); *H03K 17/063* (2013.01); *H03K 17/302* (2013.01)
(58) Field of Classification Search
 USPC ................ 327/404, 419, 423, 424, 427, 434
 See application file for complete search history.

(56) References Cited

U.S. PATENT DOCUMENTS

| | | | | |
|---|---|---|---|---|
| 7,038,433 B2* | 5/2006 | Fan | ...................... | H03K 17/063 323/274 |
| 7,498,778 B2* | 3/2009 | Seiersen | ................. | H02J 1/001 323/269 |
| 7,636,011 B2* | 12/2009 | Frederick | ................... | H02J 1/10 327/541 |
| 7,649,404 B2* | 1/2010 | Sikora | ....................... | H02J 1/10 327/541 |
| 10,003,187 B2 | 6/2018 | Tang et al. | | |
| 10,396,777 B2 | 8/2019 | Phichej | | |
| 2015/0270700 A1 | 9/2015 | Tang et al. | | |
| 2025/0023440 A1* | 1/2025 | Luo | ................... | H02M 3/33576 |

FOREIGN PATENT DOCUMENTS

| | | |
|---|---|---|
| TW | 200503374 A | 1/2005 |
| TW | 200618437 A | 6/2006 |
| TW | 200740070 A | 10/2007 |
| TW | 201125250 A | 7/2011 |
| TW | I521820 B | 2/2016 |
| TW | I600263 B | 9/2017 |

* cited by examiner

ORing FET CONTROL CIRCUIT AND METHOD

CROSS-REFERENCE TO RELATED APPLICATION

This application claims the benefit of U.S. Provisional Application No. 63/411,440 filed on Sep. 29, 2022, and entitled "ORING FET CONTROL CIRCUIT AND CONTROL METHOD FOR TOTEM-POLE PFC". This application also claims priority to China Patent Application No. 202310985393.5 filed on Aug. 7, 2023. The entire contents of the above-mentioned patent applications are incorporated herein by reference for all purposes.

FIELD OF THE INVENTION

The present disclosure relates to an FET (field effect transistor) control circuit and method, and more particularly to an ORing FET control circuit and method.

BACKGROUND OF THE INVENTION

A power supply system usually includes a plurality of power supply units connected to a system bus, and the plurality of power supply units are electrically connected in parallel with each other. Accordingly, an ORing device with an isolated diode is required between each power supply unit and the system bus to prevent a reverse current flowing back from the system bus to the power supply unit. Meanwhile, the effect of the malfunction of one power supply unit on the other power supply unit can be prevented. In addition, the isolated diode may be replaced by an ORing FET to reduce the voltage drop on the ORing device.

FIG. 1 illustrates a conventional ORing FET control circuit. As shown in FIG. 1, during normal operation, the ORing FET is in the on state, and a voltage +12VL charges a capacitor C. At this stage, the voltage on the base of transistor S is lower than the voltage on the emitter of transistor S (equal to the voltage +12VL), and thus the transistor S is in the off state. When an internal short circuit occurs, the voltage +12VL drops to zero, the voltage on the base of transistor S is higher than the voltage on the emitter of transistor S (equal to 0.7V), and thus the transistor S turns on. At this time, the gate voltage of the ORing FET decreases to zero through the transistor S so that the ORing FET turns off, thereby preventing the operation of other power supply units from being affected by the internal short circuit.

However, based on the operating principle of this ORing FET control circuit, when the voltage +12VL drops for some reasons (such as insufficient power supply or adopting constant-current control) rather than occurring an internal short circuit, the voltage on the base of transistor S may also be higher than the voltage on the emitter of transistor S. In this case, the transistor S would be turned on, causing the ORing FET to turn off by mistake. Moreover, this phenomenon may cause the ORing FET to turn on and off frequently.

Therefore, there is a need of providing an ORing FET control circuit and method in order to overcome the drawbacks of the conventional technologies.

SUMMARY OF THE INVENTION

The present disclosure provides an ORing FET control circuit and method, which determine whether to turn off the ORing FET according to a voltage across the ORing FET. Thereby, the ORing FET would be turned off immediately when an internal short circuit occurs, and the ORing FET is avoided being falsely triggered to turn off when an internal voltage drops for some reasons other than internal short circuit.

In accordance with an aspect of the present disclosure, an ORing FET control circuit including an ORing FET, a comparator, a first resistor, a second resistor, a first capacitor, a third resistor, a diode and a driving unit is provided. A source and a drain of the ORing FET are electrically connected to an input port and an output port respectively, and the input port and the output port are configured to receive an input voltage and to provide an output voltage respectively. A positive input terminal and a negative input terminal of the comparator are electrically connected to the input voltage and the output voltage respectively. The first resistor, the second resistor, the first capacitor and the third resistor are electrically connected in series between a reference voltage and a ground terminal sequentially. A connection node between the second resistor and the first capacitor is electrically connected to the positive input terminal, and a connection node between the first capacitor and the third resistor is electrically connected to the negative input terminal. The reference voltage is lower than a voltage at the positive input terminal. An anode and a cathode of the diode are electrically connected to a connection node between the first resistor and the second resistor and an output terminal of the comparator respectively. A driving unit is electrically connected between the output terminal of the comparator and a gate of the ORing FET and is configured to drive the ORing FET according to a driving signal provided by the output terminal. When the input voltage is lower than the output voltage, if a voltage across the ORing FET is larger than a threshold, a driving signal output by the output terminal of the comparator is at a low level, and correspondingly the driving unit turns off the ORing FET according to the driving signal. The threshold depends on resistances of the first resistor and the second resistor.

In accordance with another aspect of the present disclosure, an ORing FET control method is provided. The method includes: (a) providing an ORing FET, a comparator, a first resistor, a second resistor, a first capacitor, a third resistor and a diode, wherein a source and a drain of the ORing FET are electrically connected to an input port and an output port respectively, the input port and the output port are configured to receive an input voltage and to provide an output voltage respectively, a positive input terminal and a negative input terminal of the comparator are electrically connected to the input voltage and the output voltage respectively, the first resistor, the second resistor, the first capacitor and the third resistor are electrically connected in series between a reference voltage and a ground terminal sequentially, a connection node between the second resistor and the first capacitor is electrically connected to the positive input terminal, a connection node between the first capacitor and the third resistor is electrically connected to the negative input terminal, the reference voltage is lower than a voltage at the positive input terminal, and an anode and a cathode of the diode is electrically connected to a connection node between the first resistor and the second resistor and an output terminal of the comparator respectively; and (b) when the input voltage is lower than the output voltage, if a voltage across the ORing FET is larger than a threshold, generating a driving signal with low level by the comparator at the output terminal, and correspondingly turning off the ORing FET according to the driving signal, wherein the threshold depends on resistances of the first resistor and the second resistor.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
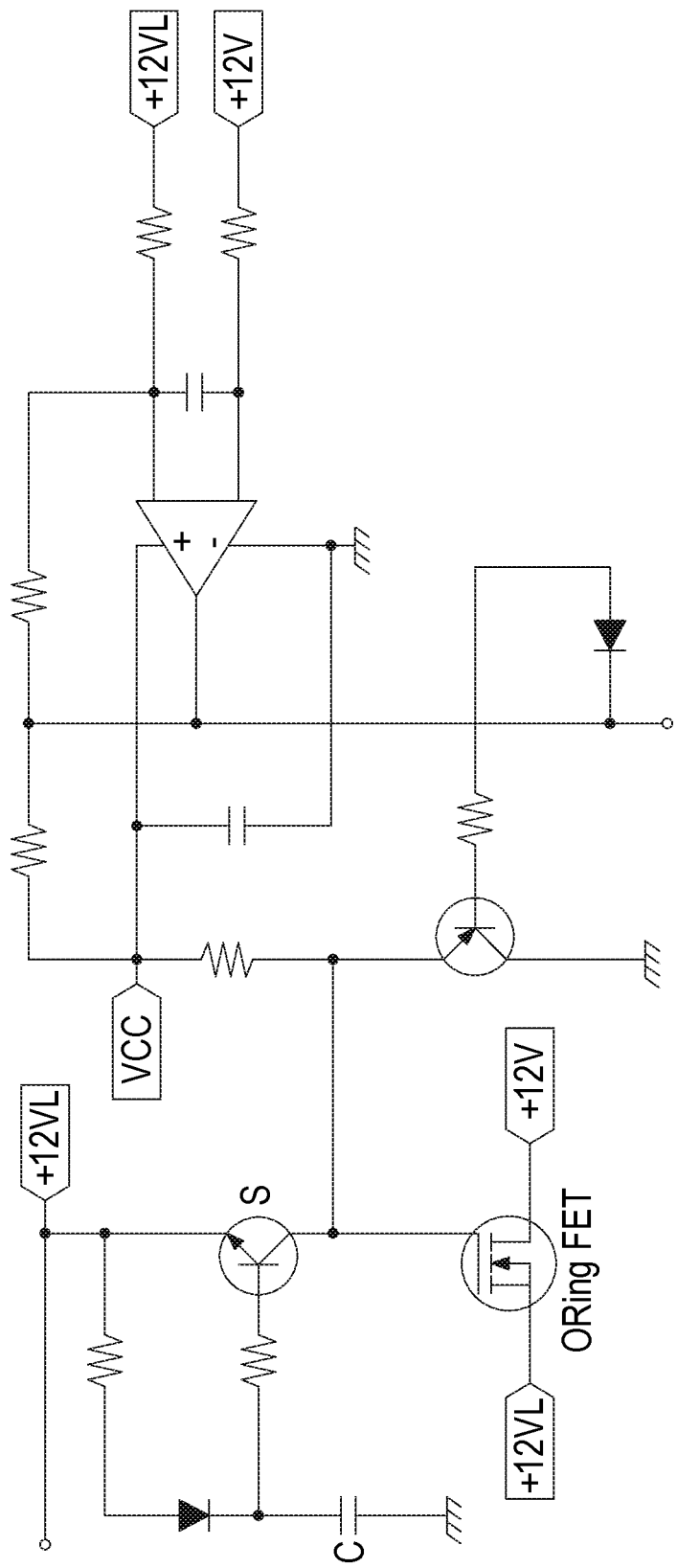
FIG. 1 illustrates a conventional ORing FET control circuit.
Figure 2:
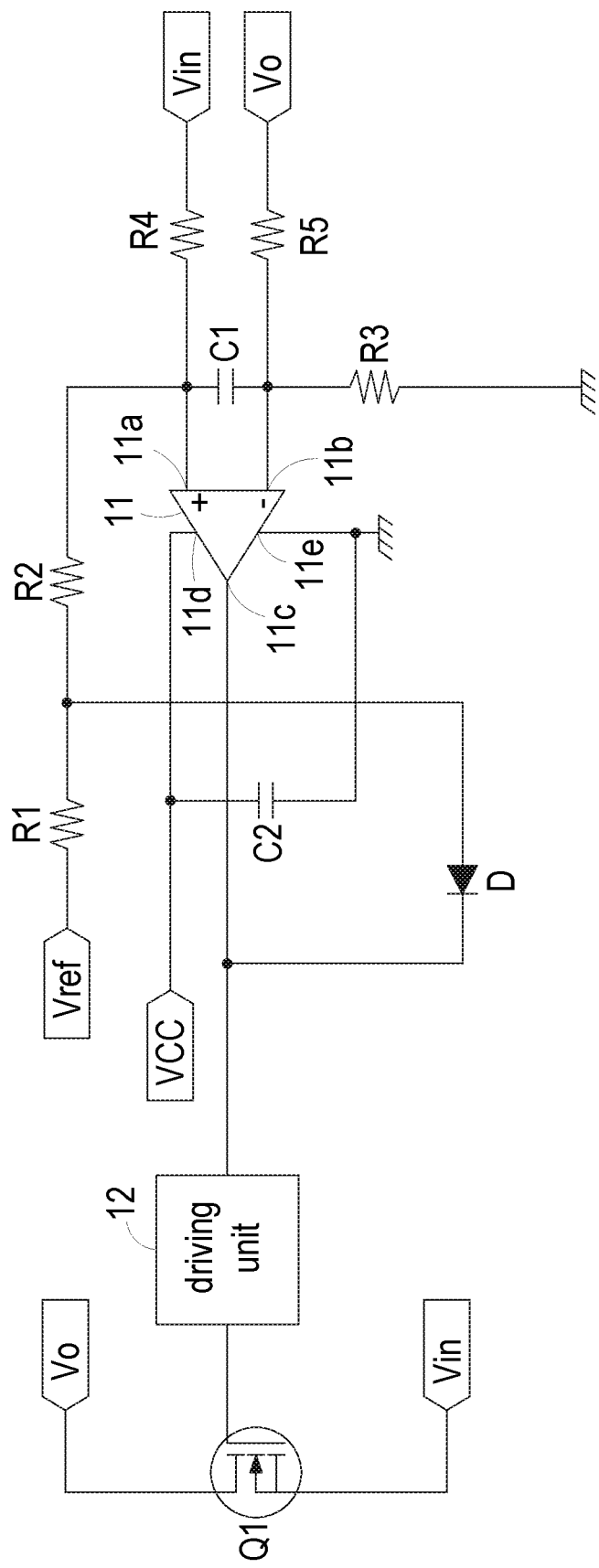
FIG. 2 is a schematic circuit diagram illustrating an Oring FET control circuit according to an embodiment of the present disclosure.

FIG. 2 is a schematic circuit diagram illustrating an ORing FET control circuit according to an embodiment of the present disclosure. As shown in FIG. 2, an ORing FET control circuit includes an ORing FET Q1, a comparator 11, a first resistor R1, a second resistor R2, a first capacitor C1, a third resistor R3, a diode D, and a driving unit 12. A source and a drain of the ORing FET Q1 are electrically connected to an input port and an output port respectively, and the input port and the output port are configured to receive an input voltage Vin and to provide an output voltage Vo respectively. In an embodiment, the input port is connected to a power supply unit (not shown), and the output port is connected to a system bus (not shown), but not limited thereto. A positive input terminal 11a and a negative input terminal 11b of the comparator 11 are electrically connected to the input voltage Vin and the output voltage Vo, respectively. The first resistor R1, the second resistor R2, the first capacitor C1, and the third resistor R3 are electrically connected in series between a reference voltage Vref and a ground terminal sequentially. The first resistor R1 and the third resistor R3 are electrically connected to the reference voltage Vref and the ground terminal, respectively. A connection node between the second resistor R2 and the first capacitor C1 is electrically connected to the positive input terminal 11a of the comparator 11, and a connection node between the first capacitor C1 and the third resistor R3 is electrically connected to the negative input terminal 11b of the comparator 11. It should be noted that the reference voltage Vref is lower than the voltage at the positive input terminal 11a. An anode of the diode D is electrically connected to a connection node between the first resistor R1 and the second resistor R2, and a cathode of the diode D is electrically connected to an output terminal 11c of the comparator 11. The driving unit 12 is electrically connected between the output terminal 11c of comparator 11 and a gate of ORing FET Q1 and is configured to drive the ORing FET Q1 according to a driving signal provided by the output terminal 11c.

When the input voltage Vin is higher than the output voltage Vo, the driving signal output by the output terminal 11c of comparator 11 is at high level, correspondingly the driving unit 12 turns on the ORing FET Q1 according to the driving signal, and the current flows from the input port to the output port.

On the contrary, when the input voltage Vin is lower than the output voltage Vo (e.g., when an internal short circuit occurs and the input voltage Vin drops to zero), the current would flow from the output port to the input port. In this case, when the voltage across the ORing FET Q1 is larger than a threshold, the driving signal output by the output terminal 11c of comparator 11 is at low level, and correspondingly the driving unit 12 turns off the ORing FET Q1 according to the driving signal. The threshold as a comparison basis may be set according to actual requirements. Since the magnitude of the threshold depends on the resistances of first resistor R1 and second resistor R2, the desired threshold may be set by adjusting the resistances of first resistor R1 and second resistor R2 to determine the turn-off speed of ORing FET Q1. Based on the set threshold, it is noted that the voltage across ORing FET Q1 is still smaller than the threshold when the input voltage Vin drops for some reasons (such as insufficient power supply or adopting constant-current control) other than internal short circuit, thereby avoiding falsely triggering the ORing FET Q1 to turn off. Furthermore, while applying to different output voltages Vo (e.g., 12V and 5V), since the voltage across ORing FET Q1 during the internal short circuit is similar, the same threshold may be used as a comparison basis without causing the ORing FET Q1 to turn off at different timings under different output voltage Vo.

In an embodiment, as shown in FIG. 2, the ORing FET control circuit further includes a fourth resistor R4, a fifth resistor R5, and a second capacitor C2. Two terminals of the fourth resistor R4 are electrically connected to the positive input terminal 11a of comparator 11 and the input voltage Vin, respectively. In other words, the positive input terminal 11a of comparator 11 is electrically connected to the input voltage Vin through the fourth resistor R4. Two terminals of the fifth resistor R5 are electrically connected to the negative input terminal 11b of comparator 11 and the output voltage Vo, respectively. In other words, the negative input terminal 11b of comparator 11 is electrically connected to the output voltage Vo through the fifth resistor R5. Two terminals of the second capacitor C2 are electrically connected to a positive supply terminal 11d and a negative supply terminal 11e of the comparator 11, respectively. The positive supply terminal 11d and the negative supply terminal 11e of the comparator 11 are electrically connected to a supply voltage VCC and the ground terminal, respectively.

Figure 3C:
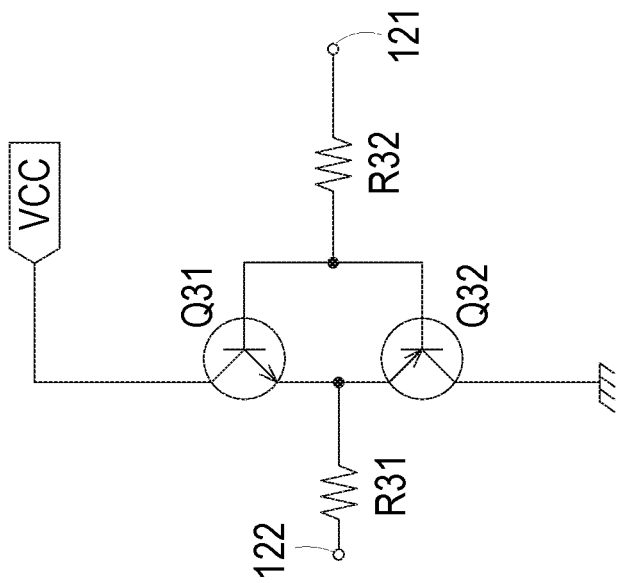
FIGS. 3A, 3B, and 3C exemplify various implementations of the driving unit of FIG. 2.
Figure 3B:
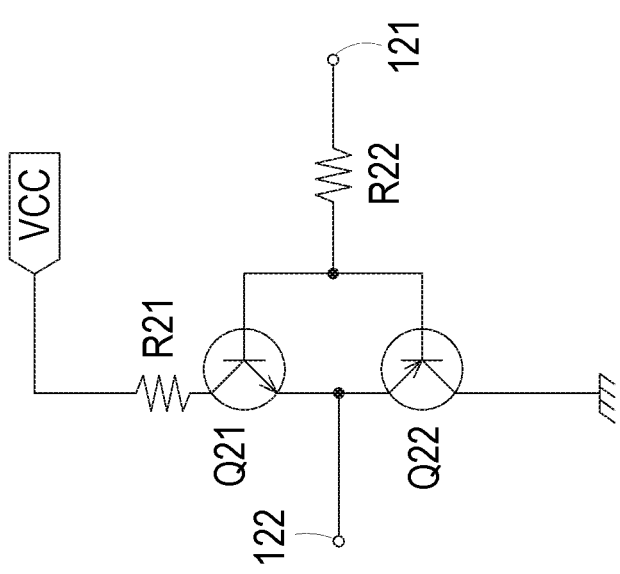
Figure 3A:
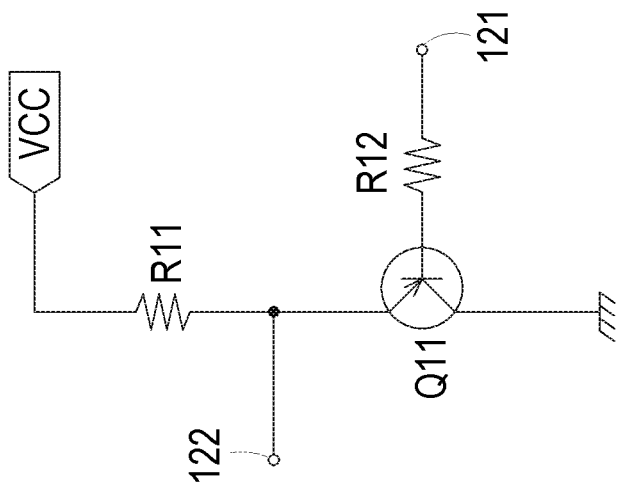

FIGS. 3A, 3B, and 3C exemplify various implementations of the driving unit of FIG. 2.

In an embodiment, as shown in FIG. 3A, an input terminal 121 and an output terminal 122 of a driving unit 12a are electrically connected to the output terminal 11c of comparator 11 and the gate of ORing FET Q1, respectively. The driving unit 12a includes a first driving resistor R11, a second driving resistor R12, and a first driving transistor Q11. Two terminals of the first driving resistor R11 are electrically connected to the supply voltage VCC and the gate of ORing FET Q1 (through the output terminal 122), respectively. Three terminals of the first driving transistor Q11 are electrically connected to the gate of ORing FET Q1 (through the output terminal 122), the ground terminal, and a first terminal of the second driving resistor R12, respectively. A second terminal of the second driving resistor R12 is electrically connected to the output terminal 11c of comparator 11 through the input terminal 121.

In an embodiment, as shown in FIG. 3B, an input terminal 121 and an output terminal 122 of a driving unit 12b are electrically connected to the output terminal 11c of comparator 11 and the gate of ORing FET Q1, respectively. The driving unit 12b includes a first driving resistor R21, a second driving resistor R22, a first driving transistor Q21, and a second driving transistor Q22. Two terminals of the first driving resistor R21 are electrically connected to the supply voltage VCC and a first terminal of the first driving transistor Q21, respectively. A second terminal and a third terminal of the first driving transistor Q21 are electrically connected to the gate of ORing FET Q1 (through the output terminal 122) and a first terminal of the second driving resistor R22, respectively. Three terminals of the second driving transistor Q22 are electrically connected to the gate of ORing FET Q1 (through the output terminal 122), the ground terminal and the first terminal of second driving resistor R22, respectively. A second terminal of the second driving resistor R22 is electrically connected to the output terminal 11c of comparator 11 through the input terminal 121.

In an embodiment, as shown in FIG. 3C, an input terminal 121 and an output terminal 122 of a driving unit 12c are electrically connected to the output terminal 11c of comparator 11 and the gate of ORing FET Q1, respectively. The driving unit 12c includes a first driving resistor R31, a second driving resistor R32, a first driving transistor Q31 and a second driving transistor Q32. Three terminals of the first driving transistor Q31 are electrically connected to the supply voltage VCC, a first terminal of first driving resistor R31, and a first terminal of second driving resistor R32, respectively. Three terminals of the second driving transistor Q32 are electrically connected to the first terminal of first driving resistor R31, the ground terminal, and the first terminal of second driving resistor R32, respectively. A second terminal of the first driving resistor R31 is electrically connected to the gate of ORing FET Q1 through the output terminal 122. A second terminal of the second driving resistor R32 is electrically connected to the output terminal 11c of comparator 11 through the input terminal 121.

It is noted that the driving transistor is exemplified as bipolar junction transistor in FIGS. 3A, 3B and 3C but is not limited thereto, actually the driving transistor may be any suitable transistor such as metal-oxide-semiconductor field-effect transistor. In addition, the implementation of the driving unit in the ORing FET control circuit of the present disclosure may be determined according to actual requirements and is not limited to that shown in FIGS. 3A, 3B and 3C. For example, the driving unit of the ORing FET control circuit may be a driving IC.

Figure 4:
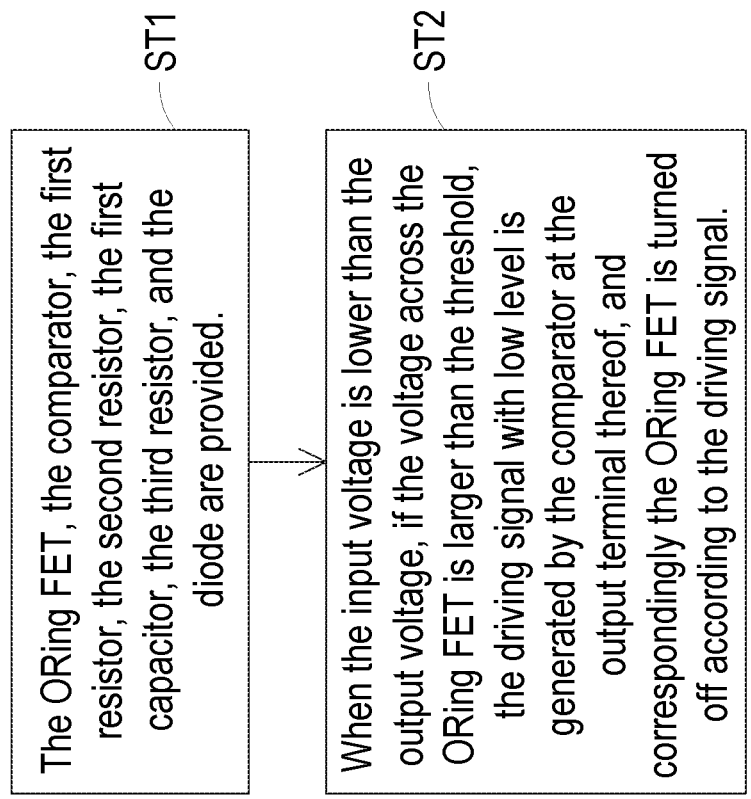
FIG. 4 is a schematic flow chart illustrating an ORing FET control method according to an embodiment of the present disclosure.

FIG. 4 is a schematic flow chart illustrating an ORing FET control method according to an embodiment of the present disclosure. The ORing FET control method is applicable for the ORing FET control circuit of the above embodiments. As shown in FIG. 4, the ORing FET control method includes the following steps.

In step ST1, the ORing FET Q1, the comparator 11, the first resistor R1, the second resistor R2, the first capacitor C1, the third resistor R3, and the diode D are provided. The connection relations of these elements are the same as that shown in FIG. 2, and thus the detailed descriptions thereof are omitted herein.

As shown in step ST2, when the input voltage Vin is lower than the output voltage Vo, if the voltage across the ORing FET Q1 is larger than the threshold, the driving signal with low level is generated by the comparator 11 at the output terminal 11c thereof, and correspondingly the ORing FET Q1 is turned off according to the driving signal. The magnitude of the threshold depends on the resistances of first resistor R1 and second resistor R2.

In an embodiment, the ORing FET control method further includes a step of: when the input voltage Vin is higher than the output voltage Vo, generating the driving signal with high level by the comparator 11 at the output terminal 11c thereof, and correspondingly turning on the ORing FET Q1 according to the driving signal.

In summary, the present disclosure provides an ORing FET control circuit and method, which determines whether to turn off the ORing FET according to a voltage across the ORing FET. Thereby, the ORing FET would be turned off immediately when an internal short circuit occurs, and the ORing FET is avoided being falsely triggered to turn off when an internal voltage drops for some reasons other than internal short circuit. In addition, the threshold as the comparison basis may be set by adjusting the resistances to determine the turn-off speed of the ORing FET. Moreover, while applying to different output voltages, the same threshold may be used without causing the ORing FET to turn off at different timings under different output voltage.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An ORing FET (field effect transistor) control circuit, comprising:
an ORing FET, having a source and a drain electrically connected to an input port and an output port respectively, wherein the input port and the output port are configured to receive an input voltage and to provide an output voltage respectively;
a comparator, having a positive input terminal and a negative input terminal electrically connected to the input voltage and the output voltage respectively;
a first resistor, a second resistor, a first capacitor and a third resistor, electrically connected in series between a reference voltage and a ground terminal sequentially, wherein a connection node between the second resistor and the first capacitor is electrically connected to the positive input terminal, a connection node between the first capacitor and the third resistor is electrically connected to the negative input terminal, and the reference voltage is lower than a voltage at the positive input terminal;
a diode, having an anode and a cathode electrically connected to a connection node between the first resistor and the second resistor and an output terminal of the comparator respectively; and
a driving unit, electrically connected between the output terminal of the comparator and a gate of the ORing FET, and configured to drive the ORing FET according to a driving signal provided by the output terminal,
wherein when the input voltage is lower than the output voltage, if a voltage across the ORing FET is larger than a threshold, the driving signal output by the output terminal of the comparator is at a low level, and correspondingly the driving unit turns off the ORing

FET according to the driving signal, wherein the threshold depends on resistances of the first resistor and the second resistor.

2. The ORing FET control circuit according to claim 1, wherein when the input voltage is higher than the output voltage, the driving signal output by the output terminal of the comparator is at a high level, and correspondingly the driving unit turns on the ORing FET according to the driving signal.

3. The ORing FET control circuit according to claim 1, further comprising a fourth resistor, wherein the positive input terminal of the comparator is electrically connected to the input voltage through the fourth resistor.

4. The ORing FET control circuit according to claim 1, further comprising a fifth resistor, wherein the negative input terminal of the comparator is electrically connected to the output voltage through the fifth resistor.

5. The ORing FET control circuit according to claim 1, further comprising a second capacitor, wherein two terminals of the second capacitor are electrically connected to a positive supply terminal and a negative supply terminal of the comparator respectively, and the positive supply terminal and the negative supply terminal are electrically connected to a supply voltage and the ground terminal respectively.

6. The ORing FET control circuit according to claim 1, wherein the driving unit comprises a first driving resistor, a second driving resistor and a first driving transistor, two terminals of the first driving resistor are electrically connected to a supply voltage and the gate of the ORing FET respectively, three terminals of the first driving transistor are electrically connected to the gate of the ORing FET, the ground terminal and a first terminal of the second driving resistor respectively, and a second terminal of the second driving resistor is electrically connected to the output terminal of the comparator.

7. The ORing FET control circuit according to claim 1, wherein the driving unit comprises a first driving resistor, a second driving resistor, a first driving transistor and a second driving transistor, two terminals of the first driving resistor are electrically connected to a supply voltage and a first terminal of the first driving transistor respectively, a second terminal and a third terminal of the first driving transistor are electrically connected to the gate of the ORing FET and a first terminal of the second driving resistor respectively, three terminals of the second driving transistor are electrically connected to the gate of the ORing FET, the ground terminal and the first terminal of the second driving resistor respectively, and a second terminal of the second driving resistor is electrically connected to the output terminal of the comparator.

8. The ORing FET control circuit according to claim 1, wherein the driving unit comprises a first driving resistor, a second driving resistor, a first driving transistor and a second driving transistor, three terminals of the first driving transistor are electrically connected to a supply voltage, a first terminal of the first driving resistor and a first terminal of the second driving resistor respectively, three terminals of the second driving transistor are electrically connected to the first terminal of the first driving resistor, the ground terminal and the first terminal of the second driving resistor respectively, a second terminal of the first driving resistor is electrically connected to the gate of the ORing FET, and a second terminal of the second driving resistor is electrically connected to the output terminal of the comparator.

9. An ORing FET control method, comprising:
(a) providing an ORing FET, a comparator, a first resistor, a second resistor, a first capacitor, a third resistor and a diode, wherein a source and a drain of the ORing FET are electrically connected to an input port and an output port respectively, the input port and the output port are configured to receive an input voltage and to provide an output voltage respectively, a positive input terminal and a negative input terminal of the comparator are electrically connected to the input voltage and the output voltage respectively, the first resistor, the second resistor, the first capacitor and the third resistor are electrically connected in series between a reference voltage and a ground terminal sequentially, a connection node between the second resistor and the first capacitor is electrically connected to the positive input terminal, a connection node between the first capacitor and the third resistor is electrically connected to the negative input terminal, the reference voltage is lower than a voltage at the positive input terminal, and an anode and a cathode of the diode is electrically connected to a connection node between the first resistor and the second resistor and an output terminal of the comparator respectively; and
(b) when the input voltage is lower than the output voltage, if a voltage across the ORing FET is larger than a threshold, generating a driving signal with low level by the comparator at the output terminal, and correspondingly turning off the ORing FET according to the driving signal, wherein the threshold depends on resistances of the first resistor and the second resistor.

10. The ORing FET control method according to claim 9, further comprising: when the input voltage is higher than the output voltage, generating the driving signal with high level by the comparator at the output terminal, and correspondingly turning on the ORing FET according to the driving signal.

* * * * *